Dec. 24, 1946.   J. O. SAVAGE   2,413,074
MASTER CARRIAGE WITH AIRPLANES FOR SUSTAINING SAME
Filed Nov. 20, 1943   2 Sheets-Sheet 1
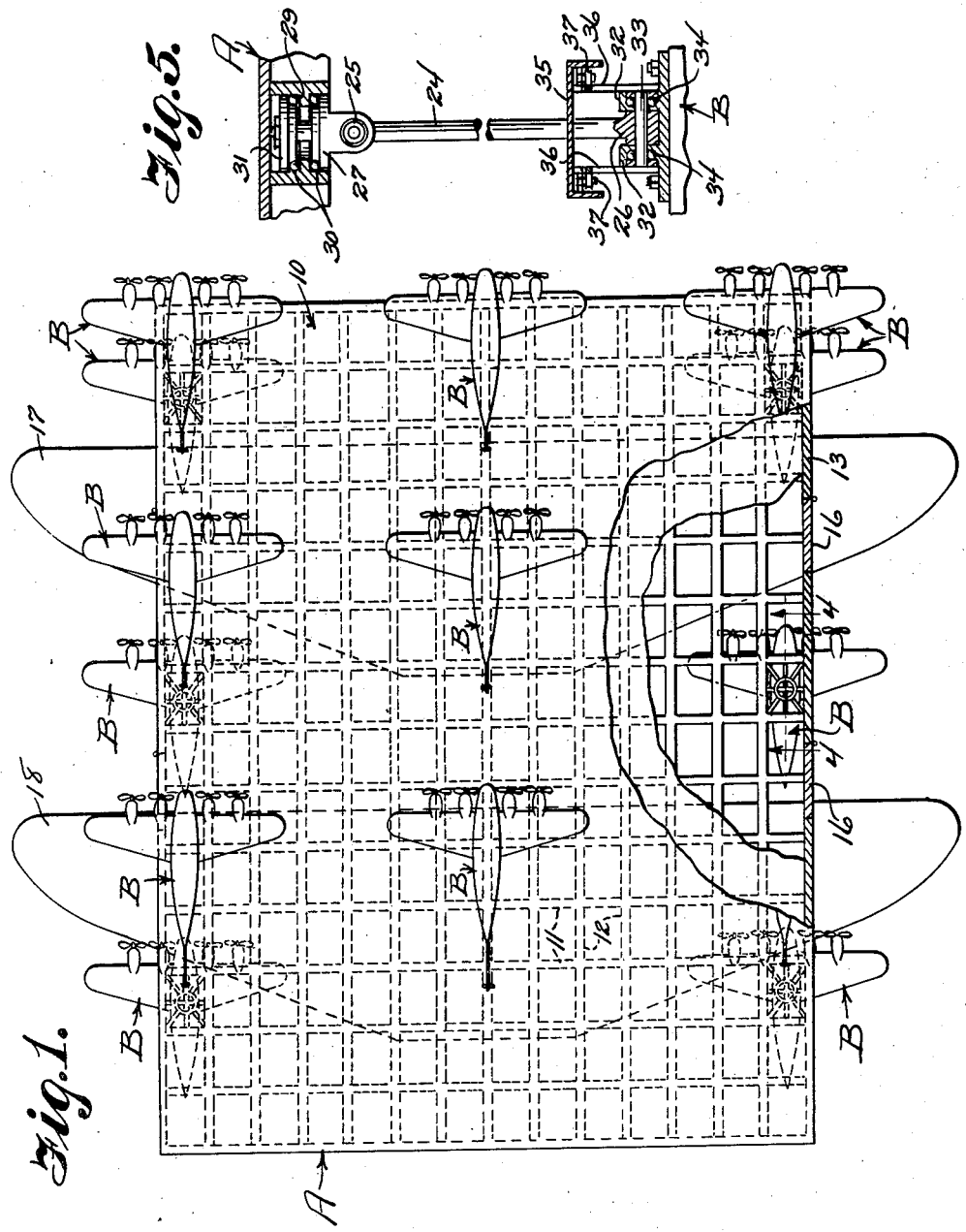
John O. Savage INVENTOR.
BY
Victor J. Evans & Co.
ATTORNEYS Dec. 24, 1946.    J. O. SAVAGE    2,413,074
MASTER CARRIAGE WITH AIRPLANES FOR SUSTAINING SAME
Filed Nov. 20, 1943    2 Sheets-Sheet 2
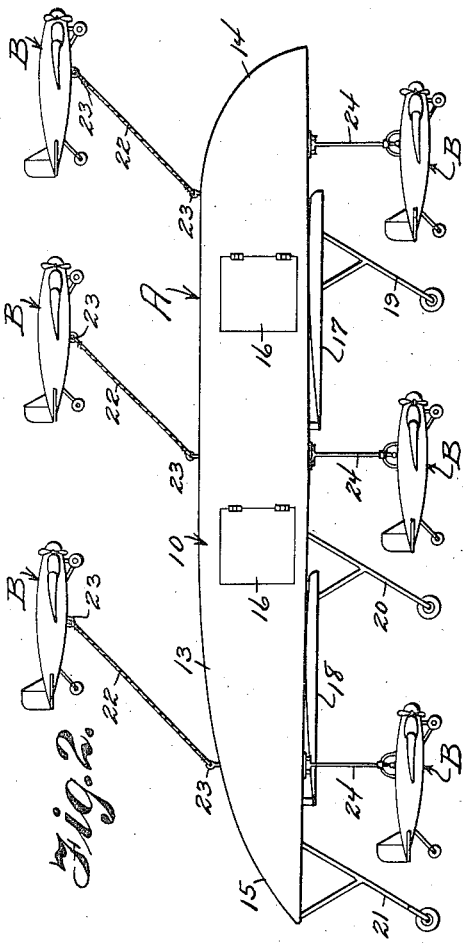
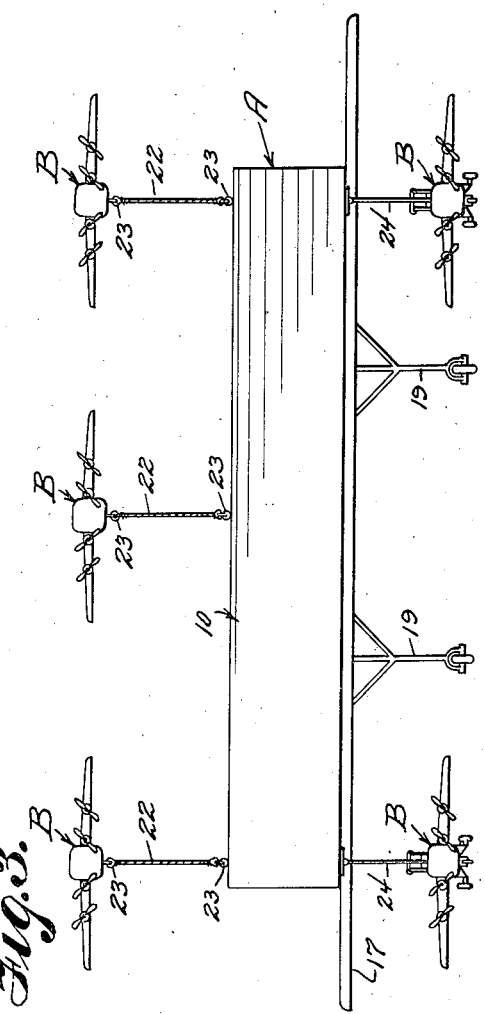
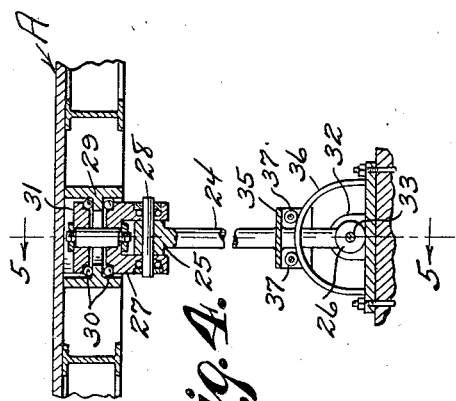
John O. Savage
INVENTOR.
BY
Victor J. Evans & Co.
ATTORNEYS Patented Dec. 24, 1946

2,413,074

UNITED STATES PATENT OFFICE 2,413,074

MASTER CARRIAGE WITH AIRPLANES FOR SUSTAINING SAME

John O. Savage, Washington, D. C.

Application November 20, 1943, Serial No. 511,128

1 Claim. (Cl. 244—2)

The invention relates to flight vehicle, and more especially to a master carriage adapted to be transported by airplanes.

The primary object of the invention is the provision of a carriage of this character, wherein its construction is such that the same can be maneuvered from a ground position into the air by airplanes, the latter sustaining said carriage in flight for the transportation thereof, as well as landing the same, the carriage being for the purpose of transporting troops, cargo of any description, or for any other purpose.

Another object of the invention is the provision of a carriage of this character, wherein the construction thereof is novel in its entirety, readily and easily navigated in the air, being readily and conveniently raised to flight and lowered to landing positions, and is glider equipped, while the carrying planes are universally connected with the said carriage for proper cooperation therewith.

A further object of the invention is the provision of a carriage of this character, which is simple in its construction, yet strong, durable, assured of maximum storage capacity, readily and easily accessible, thoroughly reliable and efficient in operation, and inexpensive to manufacture.

With these and other objects in view the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:

Figure 1 is a plan view of the carriage constructed in accordance with the invention.

Figure 2 is a side view thereof.

Figure 3 is an end elevation.

Figure 4 is a detail sectional view taken on the line 4—4 of Figure 1, looking in the direction of the arrows.

Figure 5 is a sectional view taken on the line 5—5 of Figure 4, looking in the direction of the arrows.

Similar reference characters indicate corresponding parts throughout the several views in the drawings.

Referring to the drawings in detail A designates generally the carriage in its entirety, while B are the airplanes which latter may be of any standard or desired construction for the association thereof with the carriage.

The carriage A comprises a hollow body construction 10, it being fabricated similarly to the fuselage or wing formation of an aircraft, that is to say, having the struts and ribs 11 and 12, respectively, supporting an outer wall skin 13. The nose 14 and tail 15 are preferably of the shape shown in Figure 1 of the drawings. The interior of the body 10 affords a cargo space for transportation purposes, access being had to the interior by door ways which are closed by doors 16 fastened in any suitable manner, these doors are also located at any selected area of the body 10.

Immediately beneath the body 10 are fore and aft glider wings 17 and 18, respectively, which are disposed transversely of the body and are anchored thereto in any preferred manner.

The body 10 is equipped with a landing gear, in this instance being shown as ground wheels 19, 20 and 21, respectively. They are disposed in their order fore, aft and intermediate of the body 10, the purpose thereof being clearly obvious.

Series of planes B are arranged above and below the carriage A, and those planes above the body 10 thereof are connected thereto by flexible cables 22 through the medium of coupling eyes 23 or the like. The series of planes B below the carriage A are individually universally connected thereto, each including a connecting rod 24 having upper and lower pivot terminals 25 and 26, respectively. The terminal 25 swingingly fits a turnable bearing 27 by a pivot 28, the bearing 27 being mounted in a bearing ball raceway part 29, built on the body 10, for swivel action of the bearing. The bearing balls are indicated at 30, and the raceway at 31, respectively.

The terminal 26 is swingingly fitted to a bearing 32 stationarily mounted on the plane A by a pivot 33, the latter being associated with bearing rollers 34, while the rod 24 has a saddle 35 bridging upwardly arched tracks 36, centered with respect to the pivot 33, and such saddle 35 is arranged with traction rollers 37 movable upon the tracks 36, as is clearly shown in Figures 4 and 5 of the drawings.

It should be clearly apparent that the carriage A is carried from a landing position to a flight position by the planes B, and is sustained in flight by the latter, the landing of the carriage being also effected by the said planes.

The planes B are susceptible of free navigation in the air and master the navigation of the carriage A during flight.

The uppermost planes B of the series may be initially brought to superposed relation to the carriage A in any approved manner, and such constitutes no part of the present invention.

It is of course to be understood that changes, variations and modifications may be made in the invention, without departing from the spirit thereof or sacrificing any of its advantages, as fall properly within the scope of the annexed claim.

What is claimed is:

An airplane carrier comprising a body adapted to be supported and conveyed by an airplane, said body having a flat lower face, glider wings carried by the lower face of the body and extending beyond the sides thereof, a series of rigid spaced landing gears carried by the lower face of the body, and airplanes rigidly supported by the lower face of the body and having their landing gears in the same horizontal plane with those of the body.

JOHN O. SAVAGE.